US011609412B2

(12) United States Patent
Ogien

(10) Patent No.: US 11,609,412 B2
(45) Date of Patent: Mar. 21, 2023

(54) DEVICES AND METHODS FOR LINE-SCANNING MICROSCOPY

(71) Applicant: DAMAE MEDICAL, Paris (FR)

(72) Inventor: Jonas Ogien, Paris (FR)

(73) Assignee: DAMAE MEDICAL, Paris (FR)

( * ) Notice: Subject to any disclaimer, the term of this patent is extended or adjusted under 35 U.S.C. 154(b) by 0 days.

(21) Appl. No.: 17/782,025

(22) PCT Filed: Nov. 30, 2020

(86) PCT No.: PCT/EP2020/083951
§ 371 (c)(1),
(2) Date: Jun. 2, 2022

(87) PCT Pub. No.: WO2021/110595
PCT Pub. Date: Jun. 10, 2021

(65) Prior Publication Data
US 2022/0342194 A1    Oct. 27, 2022

(30) Foreign Application Priority Data

Dec. 3, 2019 (FR) ...................................... 1913670

(51) Int. Cl.
*G01B 11/02* (2006.01)
*G02B 21/00* (2006.01)
(Continued)

(52) U.S. Cl.
CPC ..... *G02B 21/0056* (2013.01); *G01B 9/02091* (2013.01); *G02B 21/008* (2013.01); *G02B 21/367* (2013.01)

(58) Field of Classification Search
CPC .............. G02B 21/0056; G02B 21/008; G02B 21/367; G01B 9/02091; G01B 9/0209;
(Continued)

(56) References Cited

U.S. PATENT DOCUMENTS

| 5,321,501 A | 6/1994 | Swanson et al. |
| 2006/0132996 A1 | 6/2006 | Poulton |

(Continued)

FOREIGN PATENT DOCUMENTS

| JP | 2001-221613 A | 8/2001 |
| JP | 2002-207009 A | 7/2002 |

(Continued)

OTHER PUBLICATIONS

Chen, "Real-Time Imaging of Biological Tissues using High Resolution Line-Scanning Optical Coherence Microscopy," in Conference on Lasers and Electro-Optics/Quantum Electronics and Laser Science Conference and Photonic Applications Systems Technologies, OSA Technical Digest Series (CD), Paper CFL4 (Year: 2007).*

(Continued)

*Primary Examiner* — Tarifur R Chowdhury
*Assistant Examiner* — Jonathon Cook
(74) *Attorney, Agent, or Firm* — Osha Bergman Watanabe & Burton LLP

(57) ABSTRACT

The present description relates to a device for line-scanning optical coherence tomographic microscopy. The device comprises an interferometric microscope comprising a reference arm, an object arm configured to receive an object, a beam splitter coupling said object arm and reference arm to a light source and to a sensor, and a first microscope objective arranged on said object arm. It further comprises a one-dimensional confocal spatial filtering device configured to interact with said light source in order to illuminate said object along a focal line located in an object space of the first microscope objective, and a device for unidirectional scanning of said focal line, which device is arranged on said object arm upstream of said first microscope objective and is configured to scan the focal line in a lateral direction (y)

(Continued)

substantially perpendicular to an optical axis (z) of said first microscope objective.

15 Claims, 8 Drawing Sheets

(51) Int. Cl.
 *G01B 9/02091* (2022.01)
 *G02B 21/36* (2006.01)
(58) Field of Classification Search
 CPC ............ G01B 9/02034; G01B 9/02037; G01B 9/02065
 See application file for complete search history.

(56) References Cited

U.S. PATENT DOCUMENTS

| | | | |
|---|---|---|---|
| 2010/0151684 A1 | 6/2010 | Choi et al. | |
| 2014/0028974 A1* | 1/2014 | Tumlinson | G01B 9/02047 356/457 |
| 2016/0209201 A1* | 7/2016 | Everett | G01B 9/02056 |
| 2016/0320598 A1 | 11/2016 | Dubois | |
| 2017/0231488 A1* | 8/2017 | Tumlinson | A61B 3/0041 351/221 |
| 2018/0259316 A1* | 9/2018 | Tumlinson | G01B 9/02004 |
| 2019/0365220 A1* | 12/2019 | Frisken | G06T 7/33 |

FOREIGN PATENT DOCUMENTS

| | | |
|---|---|---|
| JP | 2017-504015 A | 2/2017 |
| JP | 2017-522066 A | 8/2017 |
| WO | 2015189174 A2 | 12/2015 |
| WO | 2020/017017 A1 | 1/2020 |

OTHER PUBLICATIONS

Dubois et al., "Line-field confocal optical coherence tomography for high-resolution noninvasive imaging of skin tumors," J. Biomed. Opt. 23(10) 106007 (Oct. 23, 2018) (Year: 2018).*
International Search Report issued in Application No. PCT/EP2020/083951 dated Feb. 17, 2021 (3 pages).
Written Opinion issued in Application No. PCT/EP2020/083951 dated Feb. 17, 2021 (8 pages).
Yu et al., "Real-Time Imaging of Biological Tissues using High Resolution Line-Scanning Optical Coherence Microscopy", CLEO '07, 2007 Conference on Lasers and Electro-Optics, May 5-11, 2007, Baltimore, MD, USA, (2 pages).
Written Opinion issued in Application No. PCT/EP2020/083951 dated Aug. 16, 2021 (4 pages).
International Preliminary Report on Patentability issued in International Application No. PCT/EP2020/083951; dated Nov. 4, 2021 (28 pages).
Y. Chen et al. "High-resolution line-scanning optical coherence microscopy" Optical Society of America: Optics Letters, vol. 32, No. 14; Jul. 15, 2007 (3 pages).
A. F. Fercher et al. "Optical coherence tomography—principles and applications" Institute of Physics Publishing: Reports on Progress in Physics, 66; Jan. 20, 2003 (66 pages).
D. Huang et al. "Optical Coherence Tomography" Science, 254; Nov. 22, 1991 (5 pages).
J. A. Izatt et al. "Optical coherence microscopy in scattering media" Optical Society of America: Optics Letters, vol. 19, No. 8; Apr. 15, 1994 (3 pages).
Notification of Reasons for Rejection issued in Japanese Application No. 2022-534216 dated Nov. 22, 2022 (4 pages).

* cited by examiner

DEVICES AND METHODS FOR LINE-SCANNING MICROSCOPY

TECHNICAL FIELD OF THE INVENTION

The present description relates to devices and methods for line-scanning microscopy. More specifically, the devices and methods are based on line-scanning optical coherence tomographic microscopy.

STATE OF THE ART

Optical coherence tomography (OCT) is based on the use of a low-coherence interferometer.

This imaging technique, described for example in D. Huang et al. [Ref. 1], enables sectional images of tissues to be produced with an axial resolution of a few microns.

More precisely, scanning OCT techniques are known in particular.

In a version of OCT in the time domain (time domain OCT), as described in [Ref. 1], a beam of white light is divided into two parts, one focused on the tissue to be studied and the other on a reference mirror. The light reflected (backscattered) by the observed object is combined with the light reflected by the reference mirror and detected by a photodetector. Interference occurs only when the optical path difference is at most of the order of the coherence length of the radiation; changing the optical length of the reference arm of the interferometer gives access to different depths in the object. A 2-dimensional or even 3-dimensional image can be constructed by virtue of interferometry (which permits acquisition according to the axial dimension, that is to say the depth) and of scanning (which permits acquisition according to one or two lateral dimensions). In the case of OCT with scanning in the frequency domain (frequency domain OCT), the reference arm has a fixed optical length and the interferometric signal is analyzed spectrally. In this regard, see the article by A. F. Fercher et al. [Ref. 2] In practice, in scanning OCT, it is difficult to obtain lateral resolutions better than about a few micrometers.

With the particular aim of improving lateral resolution, the article by J. A. Izatt et al. [Ref. 3] describes an improved technique combining optical coherence tomography and confocal microscopy. Confocal microscopy makes it possible to significantly reduce the number of photons backscattered by areas of the sample that are located outside the coherence volume and are perceived by the sensor, which makes it possible to increase the signal-to-noise ratio.

More recently, the article by Y. Chen et al. [Ref. 4] has proposed an LS-OCM device for line-scanning optical coherence tomographic microscopy. Such a device is shown in FIG. 1.

The LS-OCM device 100 illustrated in FIG. 1 comprises an interferometric microscope 101 of the Linnik type with two microscope objectives 102, 103 respectively in the object arm and reference arm of the interferometer, said object arm and reference arm being separated by a beam splitter cube 104. The device 100 further comprises a laser source 110, in this example a femtosecond laser source emitting pulses of wide spectral band (80 nm). One-dimensional illumination of the sample 10 is obtained with an arrangement of a cylindrical lens 111 and spherical lenses 112, 113. The optical power in the reference arm is controlled by a neutral density filter 105, and a glass slide 106 is arranged in the object arm in order to compensate for dispersion. The light coming from the object arm and reference arm is recombined by the beam splitter cube 104 and projected by means of a lens 121 onto a one-dimensional camera 122, making it possible to obtain an interferometric signal. The interferometric signal is modulated by sinusoidally actuating a reference mirror 107 arranged in a focal plane of the microscope objective 103 of the reference arm, by means of a piezoelectric transducer 108, and an image of a line of the sample is reconstructed from a combination of four interference signals resulting from the modulation.

The microscopy device described in FIG. 1 has a linear or one-dimensional (in one direction) confocal filtering configuration; in fact, the illumination line is optically conjugated with a one-dimensional sensor whose detection surface has a width substantially identical to a width of the image of the line, resulting in spatial filtering of a region of the object to be observed.

Thus, the microscopy device described in FIG. 1 has advantages linked to the confocal filtering but makes it possible to gain in speed of acquisition compared to the scanning optical coherence tomographic microscopy described in [Ref. 3], due to the parallel acquisition on one line.

Moreover, in [Ref. 4], en-face images of the sample can also be generated by scanning the sample 10 in a direction perpendicular to the illumination line, by means of a translation stage 109.

Although permitting the formation of en-face images of the sample with an axial resolution, that is to say in the direction of the optical axis of the microscope objective 102, of about 3 µm, and a lateral resolution, that is to say in a direction contained in a plane perpendicular to the optical axis of the microscope objective, of about 2 µm, the device described in [Ref. 4] is not suitable for microscopy of samples in vivo, the sample having to be moved for the production of en-face images. Moreover, if they were envisioned, mechanisms for scanning the illumination and detection beams would lead to an increase in the overall size of the device, which is something to avoid with a view to industrialization.

The present description proposes devices and methods for line-scanning optical coherence tomographic microscopy for forming en-face images of a sample in vivo, with rapid acquisition of the images and a small overall size of the device.

SUMMARY OF THE INVENTION

In the present description, the term "comprise" signifies the same thing as "include", "contain", and is inclusive or open and does not exclude other elements which are not described or shown. Further, in the present description, the term "about" or "substantially" is synonymous with (signifies the same thing as) an upper and/or lower margin of 10%, for example 5%, of the respective value.

According to a first aspect, the present description relates to a device for line-scanning optical coherence tomographic microscopy, comprising:
  a spectrally broadbandlight source;
  a sensor with a one-dimensional sensing surface;
  an interferometric microscope comprising a reference arm, at the end of which is arranged a reflecting reference surface, an object arm configured to receive an object to be imaged, a beam splitter coupling said object arm and reference arm to said light source and to said sensor, and at least one first microscope objective arranged on said object arm;
  a one-dimensional confocal spatial filtering device configured to interact with said light source in order to illuminate said object along a focal line located in an object space of said first microscope objective, and configured to select the light backscattered by said object and coming from said focal line, so as to form a one-dimensional image of said focal line on the detection surface;

a device for scanning said focal line in one direction, which device is arranged on said object arm upstream of said first microscope objective and is configured to scan the focal line in a lateral direction substantially perpendicular to an optical axis of said first microscope objective;

a processing unit configured to produce at least one two-dimensional tomographic en-face image of said object to be observed, arranged in a plane substantially perpendicular to said optical axis of the microscope objective, from a plurality of one-dimensional interferometric images of the object that are produced by the interferometric microscope for different positions of said focal line during said unidirectional scanning and are acquired by said sensor.

In the present description, an optical axis of the first microscope objective arranged in the object arm is defined by a line passing through the center of a pupil of said objective and substantially perpendicular to the plane of said pupil. This line can be a broken line if the device includes fold mirrors or other light deflection elements.

Thus, in a general manner, "axial direction" will denote, in a given space of the device, a direction colone-dimensional with respect to the optical axis of said first microscope objective, considered in said space.

In general, "lateral direction" will denote, in a given space of the device, a direction perpendicular to the optical axis of said first microscope objective, considered in said space.

In the present description, the "focusing surface" is the surface formed by the focal line in the object space of the first microscope objective, during the scanning of said line. The object space of the first microscope objective is defined, in the present description, by the space in which the object of study is located in operation. The focusing surface is generally plane, substantially perpendicular to the optical axis of the first microscope objective, and defined in a region corresponding to the depth of field of said microscope objective.

The "focus surface" is a surface, in the object space, optically conjugated with the one-dimensional sensing surface by the first microscope objective and the set of optical elements present between the first microscope objective and the detection surface. The device is adjusted upstream of the formation of images such that the focusing surface is substantially coincident with the focus surface.

The original arrangement of the optical coherence tomographic microscopy device thus described, with a device for unidirectional scanning of said focal line arranged on the object arm of the interferometric microscope, upstream of said first microscope objective, permits the formation of en-face images of in vivo samples, while maintaining a small overall size of the device.

The object of study is for example, and without limitation, a skin region and applies for example to the diagnosis of different types and subtypes of skin cancer, in particular melanomas, basal cell carcinomas and squamous cell carcinomas, the diagnosis of inflammatory and bullous pathologies of the skin, the evaluation of various morphological parameters of healthy skin, the monitoring of changes in skin lesions, the examination of excision margins, etc.

According to one or more exemplary embodiments, the spectrally broadbandlight source comprises a light emitting diode or a combination of light emitting diodes, a superluminescent diode or a combination of superluminescent diodes, a halogen filament lamp, an arc lamp, a spectrally broadband laser source (source by generation of "supercontinuum", for example). In all cases, the spectral width (at half height) of the source will preferably be greater than or equal to 100 nm; the greater this spectral width, the better the axial resolution of the apparatus may be; the center band wavelength may be visible or be in the near infrared; in biological and medical applications, the near infrared is generally preferred, between 700 nm and 1500 nm. The source can be polarized or unpolarized, spatially coherent or incoherent.

Spatially coherent sources (lasers or superluminescent diodes) can be advantageous because of their greater luminance. Furthermore, in cooperation with a cylindrical lens, they make it possible to form the focal line. According to one or more exemplary embodiments, said interferometric microscope is a Linnik microscope, further comprising a second microscope objective arranged on said reference arm, said reference arm and object arm being separate. For example, the first microscope objective and the second microscope objective are identical, permitting compensation for the effects of chromatic dispersion between the two arms of the interferometer.

According to one or more exemplary embodiments, the reference arm does not comprise a microscope objective. In this case in particular, the device can further comprise an element for chromatic dispersion compensation arranged on one and/or the other of said object arm and reference arm.

According to one or more exemplary embodiments, said first microscope objective and/or said second microscope objective, when it is present, is an immersion microscope objective, that is to say a microscope objective immersed in a medium whose refractive index is substantially equal to the refractive index of the object of study.

According to one or more exemplary embodiments, said reflecting reference surface comprises a surface configured to reflect about 5% or less of the incident light. Such a reflecting reference surface comprises, for example, a glass/air interface of a glass slide (e.g. quartz). Of course, other reflecting surfaces with higher reflection coefficients can be used, such as mirrors for example.

According to one or more exemplary embodiments, the microscopy device further comprises an optical power attenuation element, arranged on the reference arm, making it possible to control the difference in optical power of the light beams propagating in each of the arms of the interferometric microscope. The attenuation element is, for example, a neutral density filter. An element for compensating for chromatic dispersion, for example a glass slide, can then be arranged on the object arm in order to compensate for the dispersion introduced by the attenuation element.

According to one or more exemplary embodiments, a sensor with a one-dimensional sensing surface is a one-dimensional sensor, for example a one-dimensional camera, of the CCD or CMOS type, comprising a plurality of elementary sensors (or "pixels") arranged according to one or more lines in order to form a one-dimensional detection surface of given width. A sensor with a one-dimensional sensing surface also comprises a two-dimensional sensor of which only one or more lines of pixels are taken into account, for example of which only one or more lines of pixels are activated electronically.

According to one or more exemplary embodiments, the selection of the light backscattered by said object and coming from said focal line for the one-dimensional confocal spatial filtering is obtained by means of said one-dimensional sensing surface, optically conjugated with said focal line, for example by means of the first microscope objective and a tube lens arranged downstream of the interferometric microscope, and whose width is adapted to the width of the image of the focal line on the detection surface. The one-dimensional sensing surface is therefore part of the one-dimensional confocal spatial filtering device.

According to one or more exemplary embodiments, the selection of the light backscattered by said object and coming from said focal line for the one-dimensional confocal spatial filtering is obtained by means of a spatial filtering element, for example a slit, optically conjugated with said focal line by the first microscope objective and a tube lens arranged downstream of the interferometric microscope. In this example, the dimensions of the spatial filtering element, for example the width of the slit, are adapted to the width of the image of the focal line in a plane of said spatial filtering element. The spatial filtering element is, for example, optically conjugated with the detection surface of the sensor.

In either of the two cases respectively, the width of the one-dimensional sensing surface or of the slit can be less than 10 times, advantageously less than 5 times, the width of the image of the focal line. For example, the width of the one-dimensional sensing surface or of the slit can be substantially equal to the width of the image of the focal line.

According to one or more exemplary embodiments, the one-dimensional confocal spatial filtering device comprises a cylindrical lens, arranged upstream of the interferometric microscope, which cooperates with the spectrally broadband light source in order to form said focal line in an object space of the first microscope objective. The spectrally broadband light source is, for example, a spatially coherent light source, for example a supercontinuum laser or a superluminescent diode. Such a one-dimensional confocal spatial filtering device is advantageous in that it allows the object to be illuminated along a line with satisfactory optical power, for example of the order of a few milliwatts. However, the one-dimensional confocal spatial filtering device can comprise, in other exemplary embodiments, a one-dimensional opening arranged in a plane optically conjugated with a plane of the source, for example a slit, and an objective upstream of the interferometric microscope which cooperates with said first microscope objective so as to form said focal line.

According to one or more exemplary embodiments, the device for unidirectional scanning of the focal line comprises a reflecting surface, for example a mirror, and means for rotating said reflecting surface on an axis of rotation substantially perpendicular to the optical axis of the first microscope objective.

The device for unidirectional scanning of the focal line is arranged on the object arm, upstream of the first microscope objective.

According to one or more exemplary embodiments, the reflecting surface of the scanning device is optically conjugated with an entrance pupil of the first microscope objective in order to limit any vignetting effect.

According to other exemplary embodiments, the reflecting surface of the scanning device is simply arranged near said first microscope objective in order to limit possible vignetting of the illumination beam at the level of the entrance pupil of the first microscope objective and in order to limit vignetting of the light backscattered by the object. In particular, no optical element for optical conjugation of the reflecting surface of the scanning device and the entrance pupil of the first microscope objective is introduced, which makes it possible to promote the compact nature of the device.

According to one or more exemplary embodiments, the processing unit comprises one or more physical entities, for example one or more computers. When the present description refers to calculation or processing steps for the implementation in particular of method steps, it is understood that each calculation or processing step can be implemented by software, hardware, firmware, microcode or any suitable combination of these technologies. When software is used, each calculation or processing step can be implemented by computer program instructions or software code. These instructions can be stored or transmitted to a storage medium that is readable by the processing unit and/or can be executed by the processing unit in order to implement these calculation or processing steps. According to one or more exemplary embodiments, the processing unit is connected to a screen and/or interface for interfacing with a user.

According to one or more exemplary embodiments, a one-dimensional tomographic image is generated from a plurality of one-dimensional interferometric images by determining a dispersion of the values between successive images of said plurality of images. The dispersion is determined on the plurality of successive one-dimensional interferometric images in parallel for each point. For example, determining said one-dimensional tomographic image comprises calculating the variance of said plurality of successive one-dimensional interferometric images. According to one or more exemplary embodiments, said plurality of one-dimensional interferometric images comprises between 2 and 20, advantageously between 2 and 10, one-dimensional interferometric images.

According to one or more exemplary embodiments, the processing unit is configured to:
  produce a plurality of one-dimensional tomographic images of said object, each image of said plurality of one-dimensional tomographic images being produced from a plurality of one-dimensional interferometric images acquired by said sensor for different positions of said focal line during said unidirectional scanning; and
  produce said two-dimensional tomographic en-face image of said object from a plurality of said one-dimensional tomographic images.

In these exemplary embodiments, a displacement of the reflecting reference surface is not necessary for acquiring a one-dimensional tomographic image; in fact, on account of the scanning of the focal line, and if the reflecting surface of the device for scanning the focal line is not optically conjugated with the entrance pupil of the first microscope objective, a plurality of one-dimensional interferometric images (or one-dimensional interferometric signals) can be produced by the interferometric microscope and acquired by the sensor for a plurality of successive positions of the focal line in the object, the interferometric images of said plurality of interferometric images exhibiting, at each point, different interference states corresponding to different path differences between the light coming from the reference arm and the light coming from the object arm. From said plurality of one-dimensional interferometric images, it is possible to produce a one-dimensional tomographic image.

According to one or more exemplary embodiments, the microscopy device according to the first aspect comprises means for unidirectional displacement of said reflecting reference surface in an axial direction.

According to one or more exemplary embodiments, the processing unit is configured to:
- produce a plurality of one-dimensional tomographic images of said object, each image of said plurality of one-dimensional tomographic images being produced from a plurality of one-dimensional interferometric images acquired by said sensor for different positions of the reflecting reference surface; and
- produce said two-dimensional tomographic en-face image of said object from a plurality of said one-dimensional tomographic images.

In these exemplary embodiments, a one-dimensional tomographic image is produced from a plurality of one-dimensional interferometric images acquired by said sensor for different positions of the reflecting reference surface, resulting in different path differences between the light coming from the reference arm and the light coming from the object arm, and therefore different interference states for the interferometric images of said plurality of one-dimensional interferometric images. In these exemplary embodiments, the displacement of the focal line during the production of a one-dimensional interferometric image is advantageously substantially zero or sufficiently small so as not to deteriorate the tomographic image thus produced.

According to one or more exemplary embodiments, said means for moving said reflecting reference surface are configured to further introduce an additional axial displacement of said reflecting reference surface, making it possible to compensate for a phase shift introduced by the device for scanning the focal line.

The applicant has in fact shown that, during the unidirectional scanning of the focal line for the production of an en-face image, the "coherence surface", that is to say the surface of zero path difference which is the surface effectively observable, is not strictly plane but takes the form of a parabolic surface. This can result in a "blurry" en-face image. The introduction of an additional axial displacement of said reflecting reference surface then makes it possible to introduce a compensating phase shift, in order to obtain better superposition of the coherence surface and of the focusing surface, and to produce a substantially plane en-face image with better sharpness.

According to one or more exemplary embodiments, the microscopy device according to the first aspect further comprises a fold reflecting surface arranged in the reference arm, and means for moving said fold reflecting surface in one and/or the other of an axial direction and a lateral direction.

According to one or more exemplary embodiments, said processing unit is configured to:
- produce a plurality of one-dimensional tomographic images of said object, each image of said plurality of one-dimensional tomographic images being produced from a plurality of one-dimensional interferometric images acquired by said sensor for different positions of said fold reflecting surface; and
- produce said two-dimensional tomographic en-face image of said object from a plurality of said one-dimensional tomographic images.

Moving a fold reflecting surface arranged in the reference arm of the interferometric microscope makes it possible to further reduce the overall size of the microscopy device since it is thereby possible to avoid moving the reflecting reference surface. Furthermore, in particular when the reflecting reference surface is in a focal plane of a microscope objective, the risk of variation in the light intensity of the light coming from the reference arm during displacement of said reflecting reference surface is limited, which variation can result from impurities on the reflecting reference surface and can give rise to artefacts in the image.

According to one or more exemplary embodiments, for each image of said plurality of one-dimensional tomographic images, said means for moving said fold reflecting surface are configured to further introduce an additional displacement of said fold reflecting surface making it possible to compensate for a phase shift introduced by the device for scanning the focal line.

Of course, the compensation for a phase shift introduced by the device for scanning the focal line can also be obtained by means of an additional axial displacement of said reflecting reference surface even when the one-dimensional tomographic images are produced by acquisition of a plurality of one-dimensional interferometric images for different positions of said fold reflecting surface. Conversely, the compensation for a phase shift introduced by the device for scanning the focal line can be obtained by means of an additional displacement of said fold reflecting surface even when the one-dimensional tomographic images are produced by acquisition of a plurality of one-dimensional interferometric images for different positions of the reflecting reference surface.

According to one or more exemplary embodiments, the tomographic microscopy device according to the first aspect further comprises means for axial displacement of said focal line, in a direction parallel to said optical axis of said first microscope objective, for a displacement of said focal line in depth in the object. The focusing surface is then moved in depth in the object.

According to one or more exemplary embodiments, the processing unit is configured to further produce a three-dimensional image of said object to be observed, from a plurality of en-face images that are produced for different focusing surfaces.

According to one or more exemplary embodiments, said means for axial displacement of the focal line comprise means for displacement, integral with an assembly comprising said first microscope objective and said beam splitter, in a direction parallel to said optical axis of said first objective microscope. Such a configuration is advantageous in that it allows the coherence surface and the focusing surface to be moved simultaneously and integrally, during the axial scanning, while minimizing the weight that is to be moved.

Of course, other means for axial displacement of the focal line can be envisioned.

For example, and in a non-limiting manner, said means for axial displacement of the focal line can comprise means for displacement integral with an assembly comprising said first microscope objective and said device for unidirectional scanning of the focal line, or an assembly comprising said first microscope objective and said fold reflecting surface of the reference arm when it is present, or an assembly comprising all the elements of said interferometric microscope.

In the examples cited above, it is possible to choose for said first microscope objective, and for said second microscope objective if it is present, an immersion microscope objective. In fact, in these examples, the displacements of the coherence surface and of the focusing surface are integral; the adaptation of the refractive index of the object of study to that of the medium in which the first microscope objective is immersed makes it possible to keep them coincident.

According to other exemplary embodiments, said means for axial displacement of the focal line can comprise displacement means independent of the first microscope objective, on the one hand, and of the assembly formed of the second microscope objective, when present, with the reflecting reference surface, on the other hand, which means for axial displacement of the focal line can also comprise displacement means independent of the first microscope objective, on the one hand, and of a fold reflecting surface arranged on the reference arm, on the other hand.

In these examples, the displacements of the coherence surface and of the focusing surface are separate, and the two planes can be moved by a different amount so as to keep them coincident.

According to a second aspect, the present description relates to a method for line-scanning optical coherence tomographic microscopy, implemented by a device according to the first aspect.

According to one or more exemplary embodiments, said method according to the second aspect comprises:
  forming an illumination beam using a spectrally broadband light source;
  separating the illumination beam, by means of a beam splitter, into a first light fraction and a second light fraction, said first light fraction being sent into a reference arm at the end of which a reflecting reference surface is arranged, said second light fraction being sent into an object arm receiving an object to be imaged;
  focusing said second light fraction, by means of a first microscope objective arranged on said object arm and interacting with a confocal spatial filtering device, in order to illuminate said object to be imaged along a focal line located in an object space of said microscope objective;
  selecting, by means of said confocal spatial filtering device, the light backscattered by the object and coming from said focal line in order to form a one-dimensional image of said focal line on a one-dimensional sensing surface of a sensor;
  combining, by means of said beam splitter, the thus selected light backscattered by the object and the light resulting from the reflection, by the reflecting surface of the reference arm, of said first light fraction, in order to generate a one-dimensional interferometric image;
  scanning said focal line in one direction, in a lateral direction substantially perpendicular to an optical axis of said first microscope objective, by means of a scanning device arranged on said object arm upstream of said first microscope objective;
  producing, by means of a processing unit, at least one two-dimensional tomographic en-face image of said object to be observed, arranged in a plane substantially perpendicular to said optical axis of the microscope objective, from a plurality of one-dimensional interferometric images that are acquired by said sensor for different positions of said focal line during said unidirectional scanning.

According to one or more exemplary embodiments, producing said at least one two-dimensional tomographic en-face image of said object comprises:
  producing a plurality of one-dimensional tomographic images of said object, each image of said plurality of one-dimensional tomographic images being produced from a plurality of one-dimensional interferometric images that are acquired by said sensor for different positions of said focal line during said unidirectional scanning; and
  producing said two-dimensional tomographic en-face image of said object from a plurality of said one-dimensional tomographic images.

According to one or more exemplary embodiments, producing said at least one two-dimensional tomographic en-face image of said object comprises:
  producing a plurality of one-dimensional tomographic images of said object, each image of said plurality of one-dimensional tomographic images being produced from a plurality of one-dimensional interferometric images that are acquired by said sensor for different positions of the reflecting reference surface or for different positions of a fold reflecting surface arranged in the reference arm; and
  producing said two-dimensional tomographic en-face image of said object from a plurality of said one-dimensional tomographic images.

According to one or more exemplary embodiments, the method further comprises, for each image of said plurality of one-dimensional tomographic images, introducing an additional axial displacement of said reflecting reference surface or introducing an additional displacement of said fold reflecting surface, in order to compensate for a phase shift introduced by the device for scanning the focal line.

According to one or more exemplary embodiments, the method further comprises:
  axially moving said focal line in depth in the object, in a direction parallel to said optical axis of said first microscope objective;
  producing a three-dimensional image of said object to be observed, from a plurality of en-face images that are produced for different depths of the focal line.

BRIEF DESCRIPTION OF THE FIGURES

Other advantages and features of the invention will become apparent on reading the description, illustrated by the following figures.

DETAILED DESCRIPTION OF THE INVENTION

In the following detailed description, many specific details are set forth in order to provide a more in-depth understanding of the present description. However, it will be apparent to a person skilled in the art that the present description can be implemented without these specific details. In other cases, well-known features have not been described in detail, so as to avoid unnecessarily complicating the description.

Furthermore, in order to ensure better clarity, the features are not shown to scale in the figures.

Figure 1:
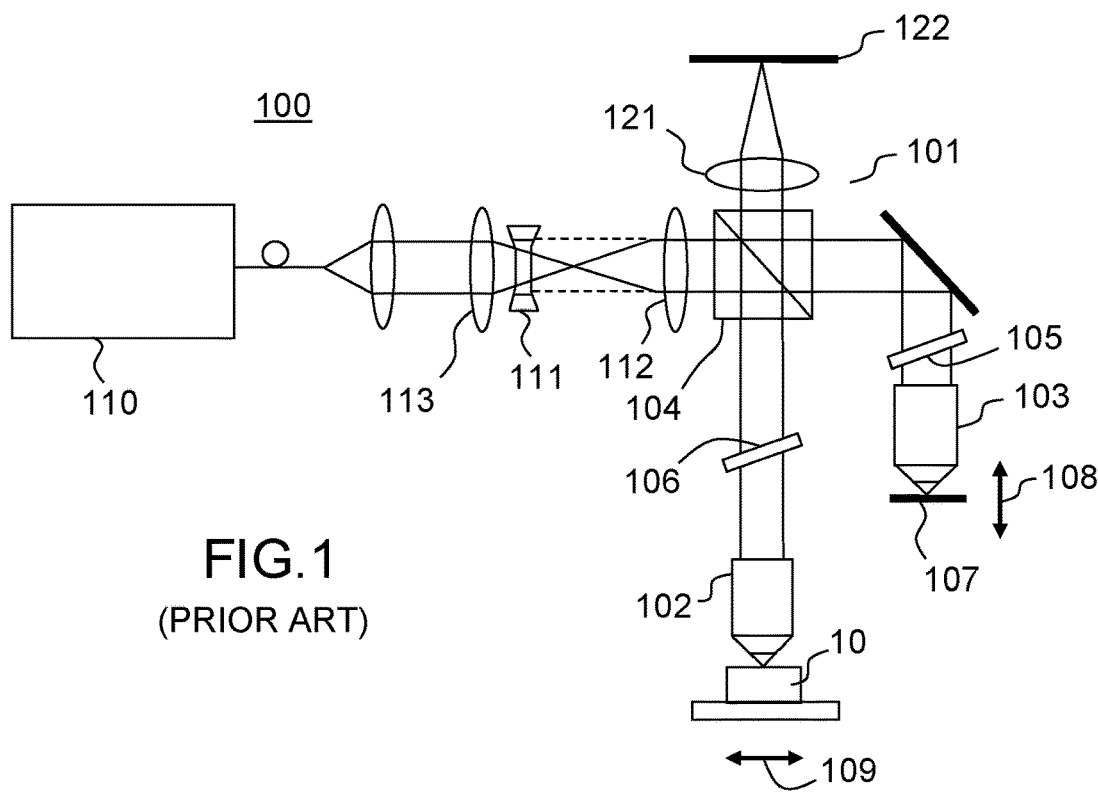
FIG. 1, already described, is a diagram illustrating a device for line-scanning optical coherence tomographic microscopy (LS-OCM) of an object, known from the prior art.
Figure 2:
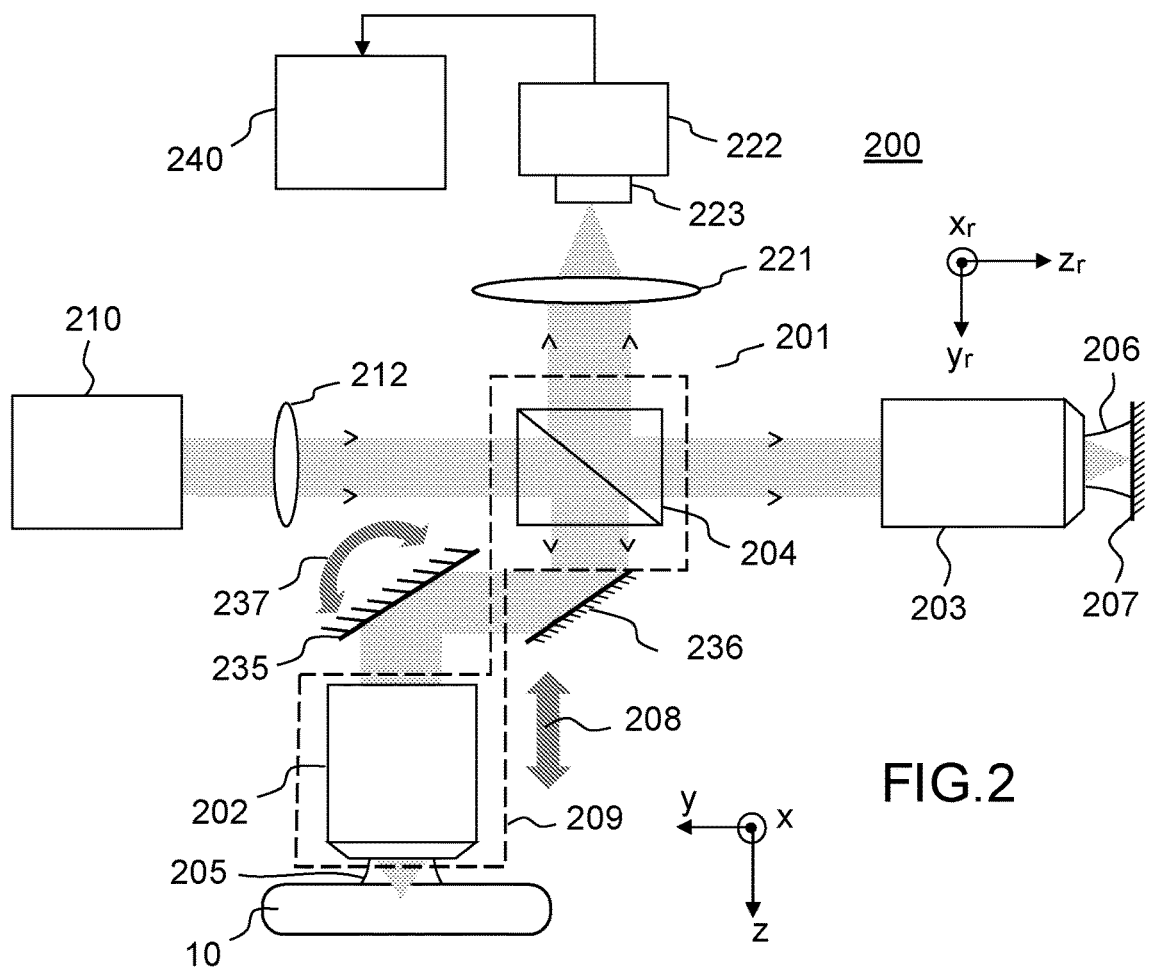
FIG. 2 is a diagram illustrating an example of a device for line-scanning optical coherence tomographic microscopy, according to the present description.

FIG. 2 is a diagram illustrating an example of a line-scanning optical coherence tomographic microscopy device, according to the present description.

The tomographic microscopy device 200 shown in FIG. 2 comprises a light source 210 with a broad spectral band, a sensor 222 with a one-dimensional sensing surface 223, for example a one-dimensional camera of the CCD or CMOS type, a processing unit 240 configured in particular to process signals coming from the sensor 222 and an interferometric microscope 201.

The interferometric microscope 201 comprises in particular a reference arm at the end of which is arranged a reflecting reference surface 207, an object arm configured to receive an object to be imaged 10, a beam splitter 204 coupling the object arm and reference arm to the light source 210 and to the sensor, and at least one first microscope objective 202 arranged on said object arm. The interferometric microscope is, for example, a Linnik type microscope, as shown in FIG. 2, with a second microscope objective 203 identical to the first microscope objective 202, arranged on the reference arm, and in the focal plane of which the reflecting reference surface 207 is located. In the example of FIG. 2, the microscope objectives 202, 203 are immersion objectives, immersed in an index liquid 205, 206, that is to say a liquid whose refractive index is adapted to the refractive index of the object 10. The interferometric microscope 201 can further comprise in a known manner an optical power attenuator (not shown), arranged on the object arm, and/or a chromatic dispersion compensator (not shown), arranged on one and/or the other of said object arm and reference arm.

The tomographic microscopy device 200 further comprises a one-dimensional confocal spatial filtering device, comprising in particular a cylindrical lens 212. The confocal filtering device is configured to interact with the light source in order to illuminate the object 10 along a focal line located in an object space of the first microscope objective (here the "object space" is defined from the point of view of the imaging, that is to say the space of the microscope objective in which, in operation, the object of study is located). It is also configured to select the light backscattered by the object and coming from said focal line, in order to form a one-dimensional image of the focal line on the detection surface 223. Examples of a one-dimensional confocal spatial filtering device will be described in more detail with reference to FIGS. 3A and 3B.

In the example of FIG. 2, the optical axis of the first microscope objective 202, defined by a line passing through the center of a pupil of the objective and substantially perpendicular to the plane of said pupil, is referenced by a spatial axis z of the object 10. The x and y axes correspond, in the example of FIG. 2, to two lateral directions in space of the object 10, that is to say two directions orthogonal to each other and perpendicular to the optical axis z of the first microscope objective 202. In the space of the reflecting reference surface, $z_r$ denotes the axial direction, that is to say the direction colone-dimensional with respect to the optical axis of the first microscope objective, considered in this space, and $x_r$, $y_r$ denote the lateral directions.

In an interferometric microscope of a device according to the present description, due to the short temporal coherence length of the spectrally broadband source, the interferences between the light reflected by the reflecting reference surface 207 and the light backscattered by the object 10 only occur when the optical paths in the object arm and reference arm are equal, with a tolerance equal to the coherence length of the source.

In the present description, the term "coherence surface" (or "zero path difference surface") refers to the virtual slice in the object for which interferences can occur. The coherence surface is the surface that can actually be observed. The term "interferometric image" refers to the interference signal resulting from the acquisition, by the sensor, of the interferences formed on the detection surface. Thus, each point of an interferometric image exhibits a given "interference state", that is to say a path difference between the light coming from the object arm and reference arm for said point less than the coherence length. In the present description, the interferometric image is one-dimensional due to the one-dimensional confocal illumination and detection. The light backscattered by the object on either side of the coherence surface contributes to creating a constant luminous background in the interference signal. By modifying the path difference between the two arms of the interferometric microscope, using means that will be described below, it is possible to modulate the interference states of the points between successive images. A combination of the one-dimensional interferometric images that are acquired by the sensor then makes it possible to form a one-dimensional tomographic image.

Various means implemented to modify the path difference between the two arms of the interferometric microscope are in particular described with reference to FIGS. 4A, 4B and 4C below.

In practice, when the path difference between successive one-dimensional interferometric images is generated according to a known law, the one-dimensional tomographic image can be determined from said interferometric images on the basis of this law.

For example, a simple approach to the formation of the one-dimensional tomographic image is based on the use of a method called phase-shift interferometry, which involves digitally combining several phase-shifted one-dimensional interferometric images. For example, it is possible to combine four one-dimensional interferometric images corresponding to positions of the focal line spaced apart by $\lambda/8n$ in the axial direction, $\lambda$ being the central wavelength of the illumination light in the object and n being the index in which the first microscope objective is immersed. This corresponds to a phase shift of $\pi/2$ between two adjacent images. If these images are indicated $E_1$, $E_2$, $E_3$, $E_4$, then $(E_1-E_3)^2+(E_2-E_4)^2$ corresponds to the amplitude of the interference signal—that is to say to the amplitude of the reconstituted image—and $(E_1-E_3)/(E_2-E_4)$ corresponds to the phase of the interference signal. This phase can provide information other than structural and tomographic information about the object. It should be noted that there is no contradiction between the notion of phase shift and the fact, mentioned above, that the focal line always corresponds to an optical path difference between object arm and reference arm equal to zero. Indeed, any structure of the object, capable of backscattering the light, is not only observed when it coincides with the focal line, but also before and after (since the coherence "gate" and that introduced by the confocal filtering have a width greater than $\lambda$). There is therefore indeed a phase shift between the contributions of this structure to the images acquired successively during the axial scanning.

As a variant, it is also possible to use an algorithm adapted to a sinusoidal phase shift between the successive images. For example, a plurality of one-dimensional interferometric images can be processed by Fourier analysis in order to extract the envelope of the interference fringes (the amplitude of the interference signal) and remove the unmodulated part of the signal (non-interferometric signal). A sinusoidal phase shift can be obtained for example, but not exclusively, in the case where the reference surface is modulated in a sinusoidal manner.

In general, the applicant has shown that it was possible to generate a one-dimensional tomographic image from a plurality of one-dimensional interferometric images by determining the dispersion between the successive images of said plurality of one-dimensional interferometric images. It is then not necessary to know precisely the law of variation of the path difference between the successive one-dimensional interferometric images. For example, in order to generate a one-dimensional tomographic image, it is possible to calculate the variance of N successive one-dimensional interferometric images, N being for example between 2 and 20, advantageously between 2 and 10, for example around 5.

The spectrally broadband source 210 comprises, for example, a supercontinuum laser, the coherence length typically being between 1 and 5 μm.

The tomographic microscopy device 200 further comprises a device 235, 237 for unidirectional scanning of said focal line, arranged on the object arm upstream of the first microscope objective 202. The unidirectional scanning device comprises for example, and in a non-limiting manner, a reflecting surface 235 and means 237 for rotating the reflecting surface on an axis of rotation perpendicular to the optical axis of the first microscope objective. The scanning device is formed, for example, of a galvanometric mirror. The device for unidirectional scanning of the focal line is configured for scanning the focal line in a lateral direction (designated y in the example of FIG. 2) substantially perpendicular to the optical axis z of said first microscope objective.

It is then possible, according to the present description, to produce, by means of the processing unit 240, at least one two-dimensional tomographic en-face image of the object 10, that is to say a two-dimensional tomographic image arranged in an x, y plane substantially perpendicular to the optical axis of the microscope objective, from a plurality of one-dimensional interferometric images of the object that are acquired by the sensor for different positions of said focal line during the unidirectional scanning.

Since the device for unidirectional scanning of the focal line is positioned in the object arm of the interferometric microscope 201, the overall size of the device 200 for acquiring the en-face image is reduced.

According to an exemplary embodiment, the reflecting surface of the device for scanning the focal line is optically conjugated with the entrance pupil of the first microscope objective 202, for example by means of an optical lens. This makes it possible to avoid vignetting of the illumination beam at the level of the entrance pupil of the first microscope objective and also vignetting of the light backscattered by the object. However, this configuration complicates assembly and increases the overall size of the device. It will therefore be preferred, as is illustrated in FIG. 2, to position the reflecting surface of the scanning device upstream of the first microscope objective 202, close to the first microscope objective in order to limit vignetting, that is to say as close to the pupil of the objective as is possible in view of the mechanical constraints of integration of the scanning device.

The processing unit 240 is generally configured for implementation of steps of the method according to the present description. The processing unit 240 can be connected to a screen and/or interface (not shown in FIG. 2) for interfacing with a user. The processing unit can also comprise means for controlling the means of rotation 237 of the reflecting surface, and/or means for controlling other mobile elements of the tomographic microscopy device according to the present description.

Figure 3A:
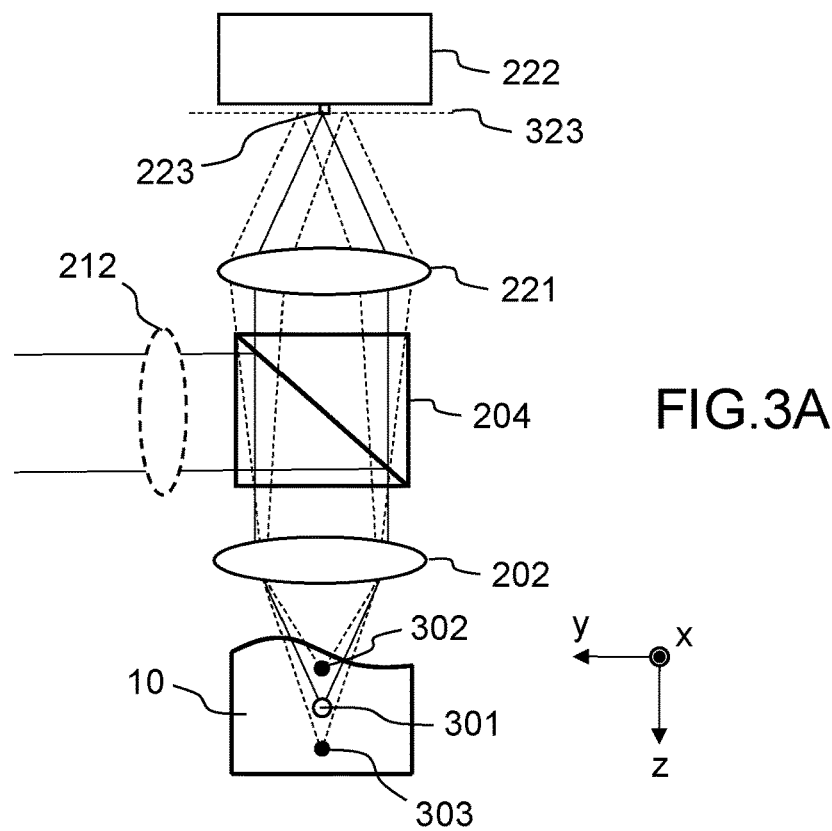
FIG. 3A illustrates, in a first view, the operation of one-dimensional confocal spatial filtering means in a line-scanning optical coherence tomographic microscopy device, according to an example of the present description.
Figure 3B:
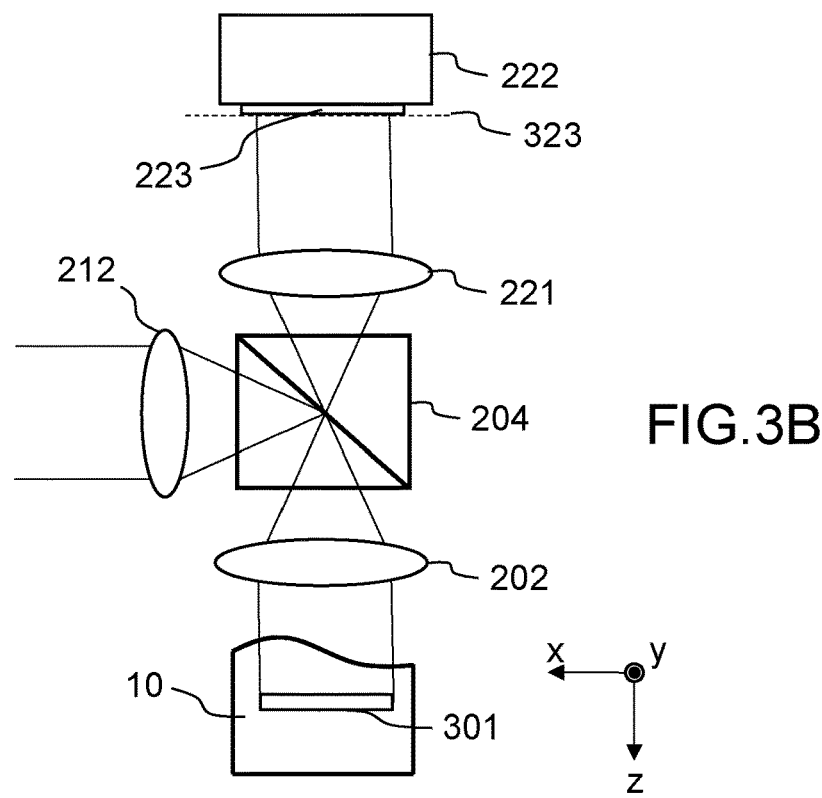
FIG. 3B illustrates one-dimensional confocal spatial filtering means as illustrated in FIG. 3A, in a second view.

FIGS. 3A and 3B illustrate, according to two perpendicular section planes (respectively the yz and xz planes containing the optical axis z of the microscope objective 202), the one-dimensional confocal spatial filtering in a line-scanning optical coherence tomographic microscopy device, according to one example of the present description. These figures show only the features of the tomographic microscopy device that are useful for an understanding of the one-dimensional confocal spatial filtering.

In this example, the one-dimensional confocal spatial filtering device comprises a cylindrical lens 212 which is arranged upstream of the interferometric microscope and which interacts with the spectrally broadband light source in order to form a focal line 301 in the object space of the first microscope objective 202. During the scanning of the focal line, the latter moves over a focusing surface, substantially coincident with a focal surface. Such a focusing surface is generally flat, substantially coincident with a focal plane of the first microscope objective 202 if the beam incident on said first microscope objective is collimated. The spectrally broadband light source is, for example, a spatially coherent light source, for example a supercontinuum laser. Such a one-dimensional confocal spatial filtering device is advantageous in that it permits illumination of the object with satisfactory optical power.

The selection of the light backscattered by the object 10 and coming from said focal line 301 for the one-dimensional confocal spatial filtering is further obtained, in this example, by means of a one-dimensional sensing surface 323 of the sensor 322, optically conjugated with the focal line by means of the first microscope objective 202 and a tube lens 221 arranged downstream of the interferometric microscope. The width of the detection surface 323 is determined according to the width of the image of the focal line on the detection surface. The one-dimensional sensing surface thus behaves like a filtering slit of given width and therefore forms part of the one-dimensional confocal spatial filtering device. It will be noted that the selection of the light backscattered by the object 10 and coming from said focal line 301 can also be obtained by a filtering slit separate from the detection surface (not shown in the example of FIGS. 3A, 3B), optically conjugated with the focal line 301 and the detection surface 323.

Thus, in the yz plane (FIG. 3A) perpendicular to the filtering slit formed by the detection surface 323, only the light coming from the region of the object where the focal line 301 is formed by the cylindrical lens 212 and the first microscope objective 202 (beam shown in solid lines) is detected by sensor 222, while the light coming from other regions 302, 303 of the object (beams in dotted lines for example) is very strongly attenuated. In a plane parallel to the filtering slit (xz plane in FIG. 3B), such filtering does not occur.

The confocal spatial filtering is complementary to the "coherent" filtering resulting from the short coherence length interferometry with a spectrally broadband source, the principle of which is recalled above. In particular, the confocal filtering improves the performance of the interferometric imaging by eliminating the "background" produced by the scattering of the light coming from areas of the sample that are located outside the focal plane and by parasitic reflections. All the dynamics of the sensor are thus used to detect the useful interferometric signal, and the signal-to-noise ratio is improved. Furthermore, interferometry—even at a low coherence length—does not make it possible to distinguish between a ballistic photon originating from the region imaged in the object and a photon originating from other regions of the object and having traveled on an optical path of the same length due to the diffusions undergone. This results in a parasitic interferometric signal which is added to the useful interferometric signal, creating artefacts in the images and limiting the accessible imaging depth. In the device according to the present description, the confocal filtering allows only the ballistic photons to pass, thereby eliminating this background.

Compared to confocal filtering alone, the use of interferometric detection permits a considerable amplification of the useful signal (in the case of "pure" confocal microscopy, it is the low signal-to-noise ratio that limits the depth of acquisition). In the device according to the present description, there is therefore a synergy—and not a simple juxtaposition—between the two principles involved: microscopy by low coherence length interferometry, and confocal slit microscopy.

Figure 4A:
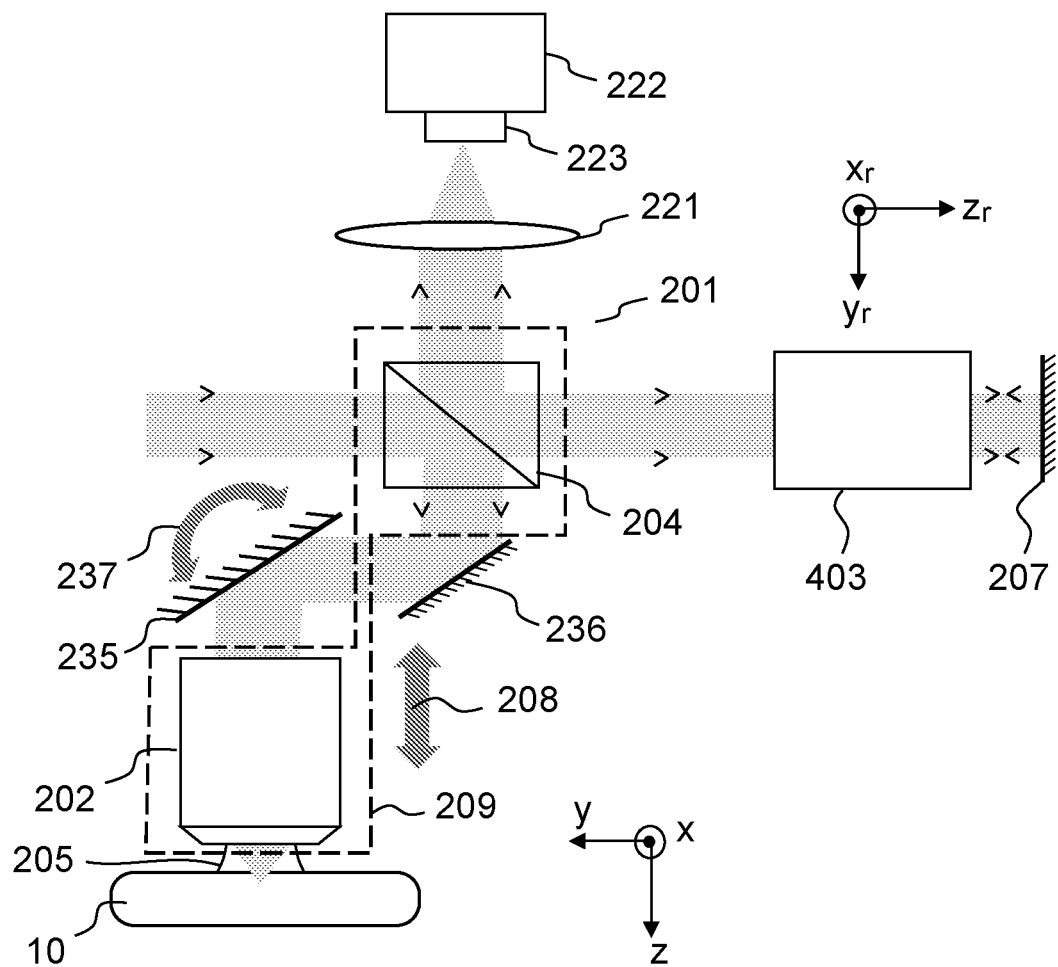
FIG. 4A is a diagram illustrating an example of a line-scanning optical coherence tomographic microscopy device, according to the present description.
Figure 4B:
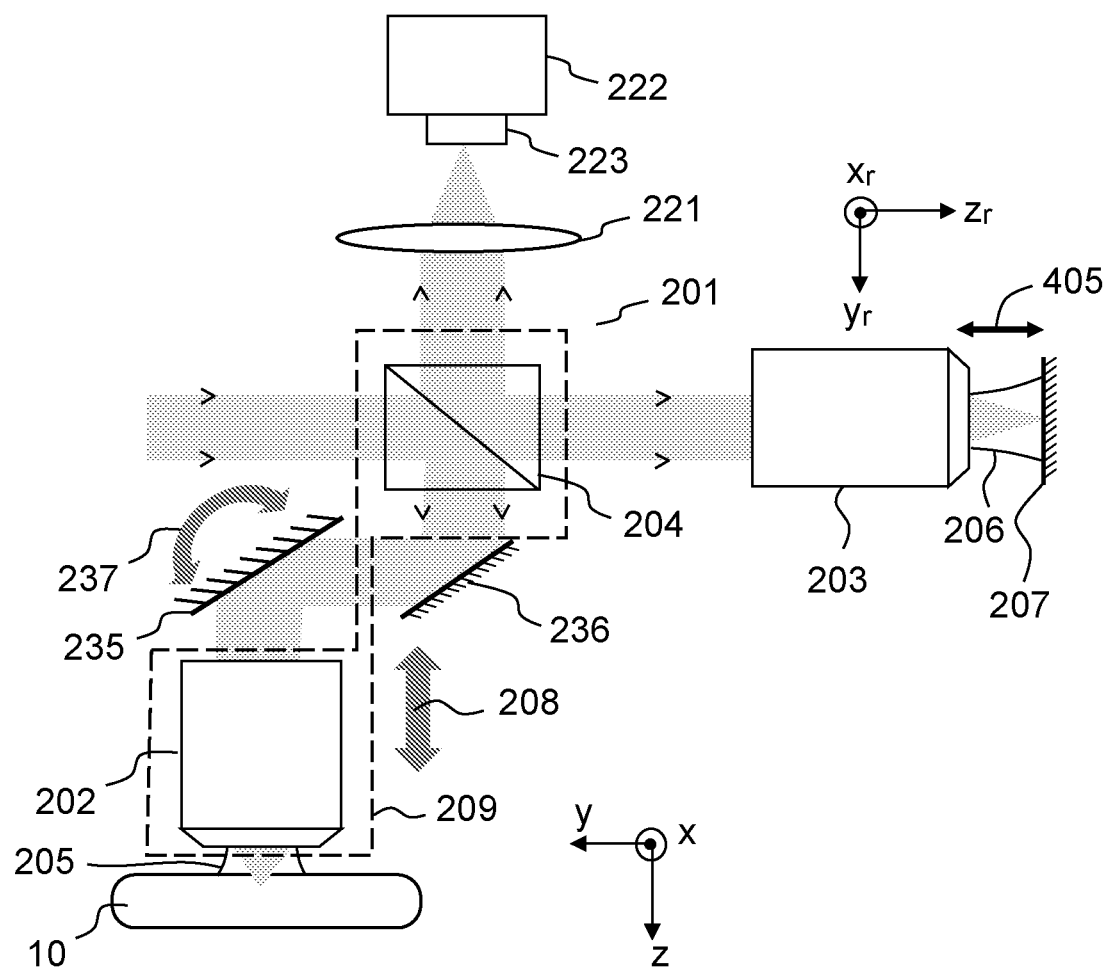
FIG. 4B is a diagram illustrating an example of a line-scanning optical coherence tomographic microscopy device, according to the present description.
Figure 4C:
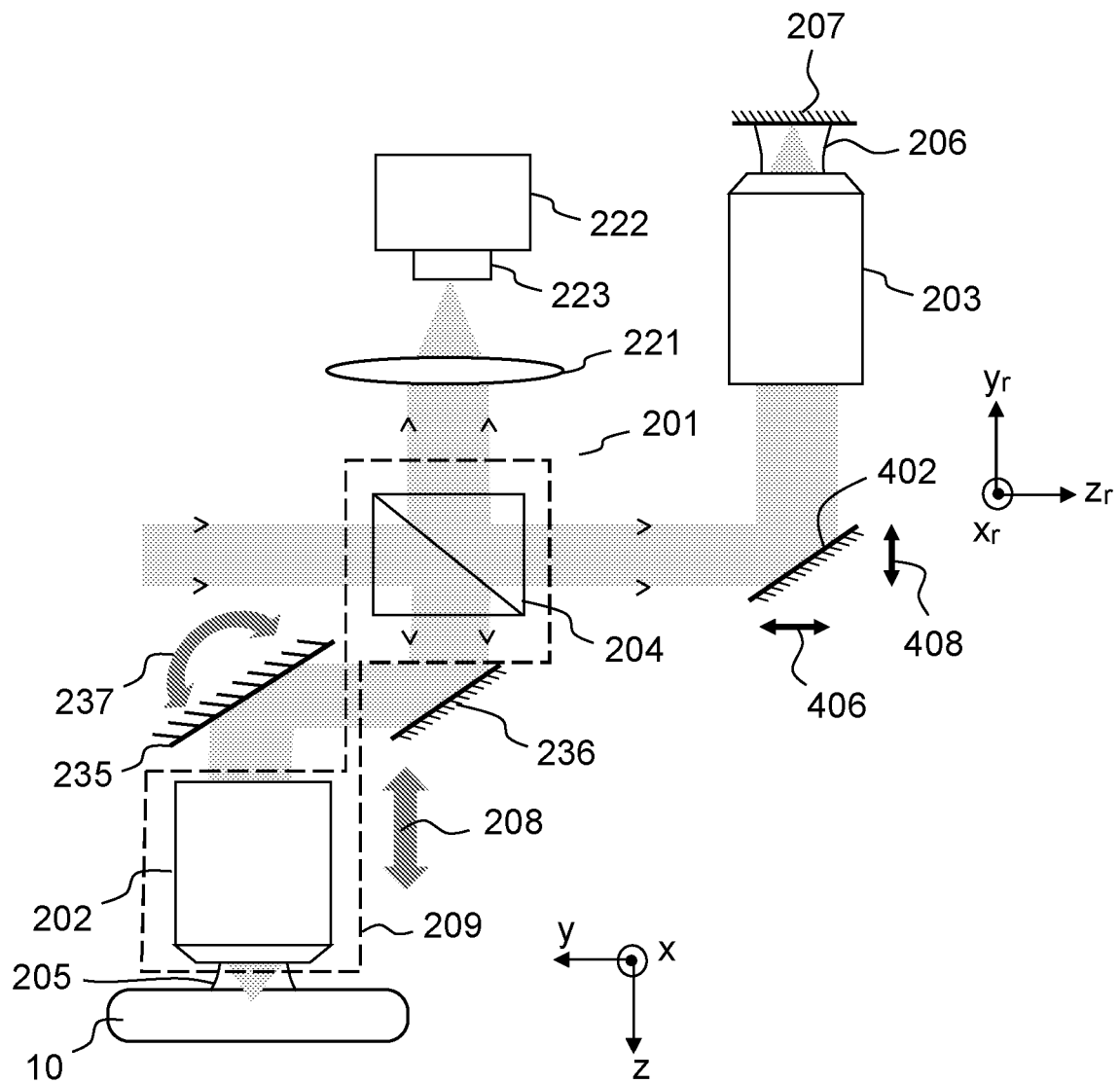
FIG. 4C is a diagram illustrating an example of a line-scanning optical coherence tomographic microscopy device, according to the present description.

FIGS. 4A, 4B and 4C illustrate three examples of tomographic microscopy devices for implementing methods according to the present description.

These diagrams show only the features of the device that are necessary for an understanding of the method according to the present description. In particular, the illumination means and the confocal spatial filtering device and the processing unit are not shown. Although some exemplary embodiments are shown only in some of the diagrams, the different embodiments described above can be combined.

In these figures, the features identical to those shown in the example of FIG. 2 are indicated with the same reference signs and are not described again.

FIG. 4A shows a first example of a device in which the interferometric microscope comprises only a single microscope objective, namely the first microscope objective 202. The object arm comprises an element 403 for compensating the chromatic dispersion, for example a glass slide.

In this example, the reflecting reference surface 207 is fixed.

Each one-dimensional tomographic image is produced in this example from a plurality of one-dimensional interferometric images that are acquired by the sensor for different positions of said focal line during the unidirectional scanning. This is made possible by the fact that the reflecting surface of the device for scanning the focal line is not optically conjugated with the entrance pupil of the first microscope objective. Thus, for a plurality of different successive positions of the focal line resulting from the scanning of observation lines, the points of successive interferometric images acquired by the sensor exhibit different interference states corresponding to different path differences (or phase shifts) between the light coming from the reference arm and the light coming from the object arm. From the plurality of one-dimensional interferometric images, it is possible to produce a one-dimensional tomographic image.

In this example, the law of variation of the path difference between two acquisitions of interferometric images is not known in such a deterministic way as when, for example, the reflecting reference surface is moved.

However, the applicant has shown that it was possible to generate one-dimensional tomographic images from a plurality of one-dimensional interferometric images by determining the dispersion between successive images, as described above.

FIG. 4B shows a second example of a device in which the interferometric microscope is of the Linnik type and comprises, in addition to the first microscope objective 202 in the object arm, a second microscope objective 203 in the reference arm. Advantageously, the two microscope objectives are identical.

In this example, the reflecting reference surface 207 is movable in translation in an axial direction $z_r$ by virtue of means for unidirectional displacement of the reflecting reference surface indicated schematically in FIG. 4B by a double arrow 405, these means comprising e a piezoelectric motor, for example.

In this example, each one-dimensional tomographic image can be produced from a plurality of one-dimensional interferometric images that are acquired by the sensor for different positions of the reflecting reference surface, resulting in different path differences between the light coming from the reference arm and the light coming from the object arm, and therefore different interference states for the different one-dimensional interferometric images. In these exemplary embodiments, the displacement of the focal line during the production of a one-dimensional interferometric image is advantageously substantially or sufficiently small so as not to degrade the one-dimensional tomographic image thus generated.

FIG. 4C again illustrates an example of a device in which the interferometric microscope is of the Linnik type.

In this example, the reflecting reference surface 207 is fixed.

The interferometric microscope comprises, in this example, a fold reflecting surface 402 arranged in the reference arm, and means 406, 408 for moving said fold reflecting surface, in one and/or the other of an axial direction $z_r$ and a lateral direction ($y_r$, in the example of FIG. 4C), the displacement means 406, 408 comprising, for example, one piezoelectric actuator or two piezoelectric actuators.

It is possible, by means of this particular arrangement, to obtain each one-dimensional tomographic image from a plurality of one-dimensional interferometric images that are acquired by the sensor for different positions of the fold reflecting surface.

Moving the fold reflecting surface 402 makes it possible to acquire a one-dimensional tomographic image without having to oscillate the reference surface 207. This has the advantage, for example, of limiting the risk of variation in the luminous intensity of the light coming from the reference arm when moving the reflecting reference surface, in particular when the reference surface is in a focal plane of the second microscope objective 203, as is illustrated in FIG. 4C, such a variation possibly resulting from impurities on the reflecting reference surface.

Furthermore, by eliminating the displacement of the reflecting reference surface 207, it is possible to further limit the overall size of the device.

In the examples illustrated in FIGS. 4A to 4C, the tomographic microscopy device further comprises means for axially moving the focal line, in a direction parallel to the optical axis z of said first microscope objective 202. This involves moving the focusing surface in order to image a plurality of en-face images of the object 10, using a method according to the present description, at different depths. A three-dimensional image of the object to be observed will then be able to be produced from the plurality of en-face images.

As is illustrated in FIGS. 4A to 4C, the means for axially moving the focal line can comprise means of displacement, integral with an assembly 209 comprising the first microscope objective 202 and the beam splitter 204, in a direction parallel to the optical axis z of the first microscope objective 202. Such a configuration is advantageous in that it allows the coherence surface and the focusing surface to be moved simultaneously and integrally, during the axial scanning, while minimizing the weight that is to be moved. This makes it possible to maximize the speed of displacement and thus of the acquisition.

Of course, other means for axially moving the focal line can be envision, not shown in the figures.

For example, and in a non-limiting manner, the means for axially moving the focal line can comprise means for displacement, integral with an assembly comprising the first microscope objective 202 and the device 235, 237 for scanning the focal line, or an assembly comprising the first microscope objective 202 and the fold reflecting surface 402 of the reference arm when it is present (FIG. 4C), or an assembly comprising all the elements of the interferometric microscope 201.

In the examples cited above, an immersion microscope objective will advantageously be chosen for the first microscope objective 202 and for the second microscope objective 203 if it is present. In fact, in these examples, the displacements of the coherence surface and of the focusing surface are integral; adapting the refractive index of the object of study 10 with that of the medium in which the first microscope objective is immersed helps to keep them coincident.

According to other examples (not shown in the figures), the means for axially moving the focal line can comprise displacement means independent of the first microscope objective 202, on the one hand, and of the assembly formed of the second microscope objective 203, when present, with the reflecting reference surface 207, on the other hand. The means for axially moving the focal line can also comprise displacement means independent of the first microscope objective 202, on the one hand, and of the fold reflecting surface 402 arranged on the reference arm, on the other hand (FIG. 4C).

In these examples, the displacements of the coherence surface and of the focusing surface are separate, and the two planes can be moved by a different amount so as to keep them coincident.

The applicant has moreover shown that, particularly in the case where, as illustrated in FIGS. 4A to 4C, the reflecting surface 235 of the device for unidirectional scanning of the focus line is not optically conjugated with the entrance pupil of the microscope objective 202, a path difference (or phase shift) can be introduced during the scanning, which causes a deformation of the zero path difference surface (coherence surface) with respect to a perfectly flat surface. As a result, the en-face image formed cannot be perfectly clear over the whole field, because the focusing surface for its part is flat and does not have a great depth of field, due to the fact of using lenses with a large numerical aperture (typically between 0.3 and 0.8).

In order to compensate for the phase shift introduced by the device for scanning the focal line and to bring coherence surface and focusing surface into coincidence, the microscopy method according to the present description can further comprise, for each image of the plurality of one-dimensional tomographic images, introducing an additional axial displacement of the reflecting reference surface 207 (FIG. 2) or of said fold reflecting surface 402 (FIG. 4C).

Figure 5A:
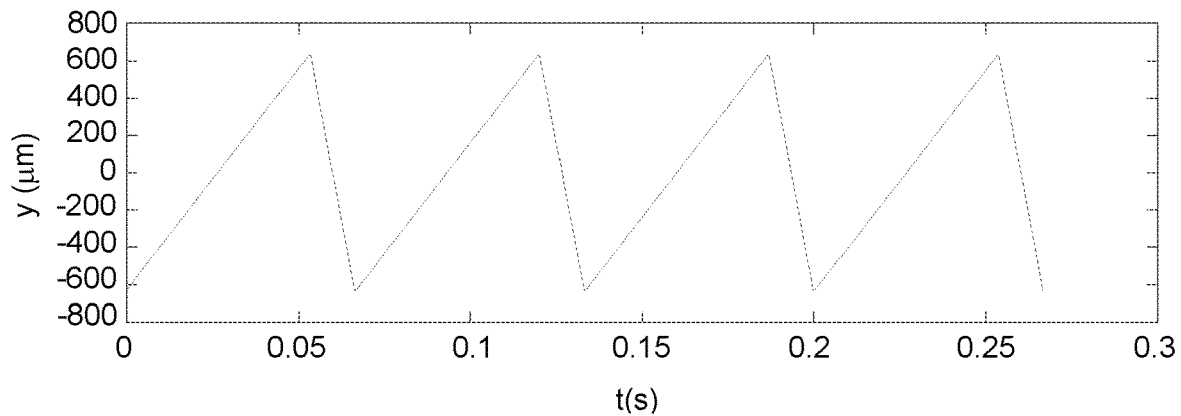
FIG. 5 A is a diagram illustrating an example of the unidirectional scanning of the focal line, as a function of time.
FIG. 5B is a diagram illustrating, according to one example, a section of the coherence surface when the focal line is shifted laterally according to the scanning illustrated in FIG. 5A, and the coherence surface when the focal line is shifted laterally according to the scanning illustrated in FIG. 5A, with compensation by means of a variation in the axial position of the reflecting reference surface, also shown in FIG. 5B.
FIG. 5C is a diagram illustrating, according to one example, a section of the coherence surface when the focal line is shifted laterally according to the scanning illustrated in FIG. 5A, and the coherence surface when the focal line is shifted laterally according to the scanning illustrated in FIG. 5A, with stepwise compensation by means of a variation in the axial position of the reflecting reference surface, also shown in FIG. 5C.
Figure 5B:
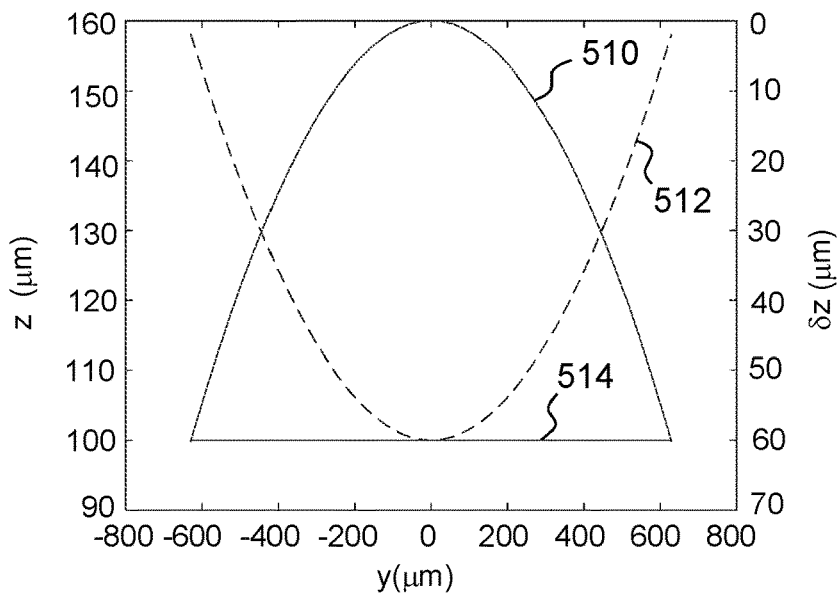
Figure 5C:
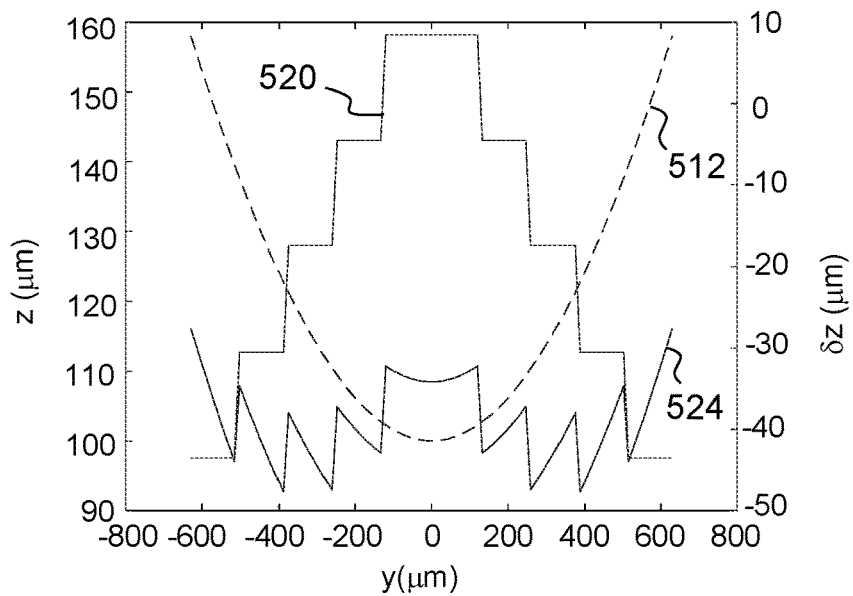

FIGS. 5A to 5C are therefore diagrams showing an example of the unidirectional scanning of the focal line, as a function of time (FIG. 5A), and diagrams (FIGS. 5B, 5C) showing two examples of sections of the coherence surface when the focal line is moved laterally according to the scanning illustrated in FIG. 5A, with or without compensation.

Figure 6A:
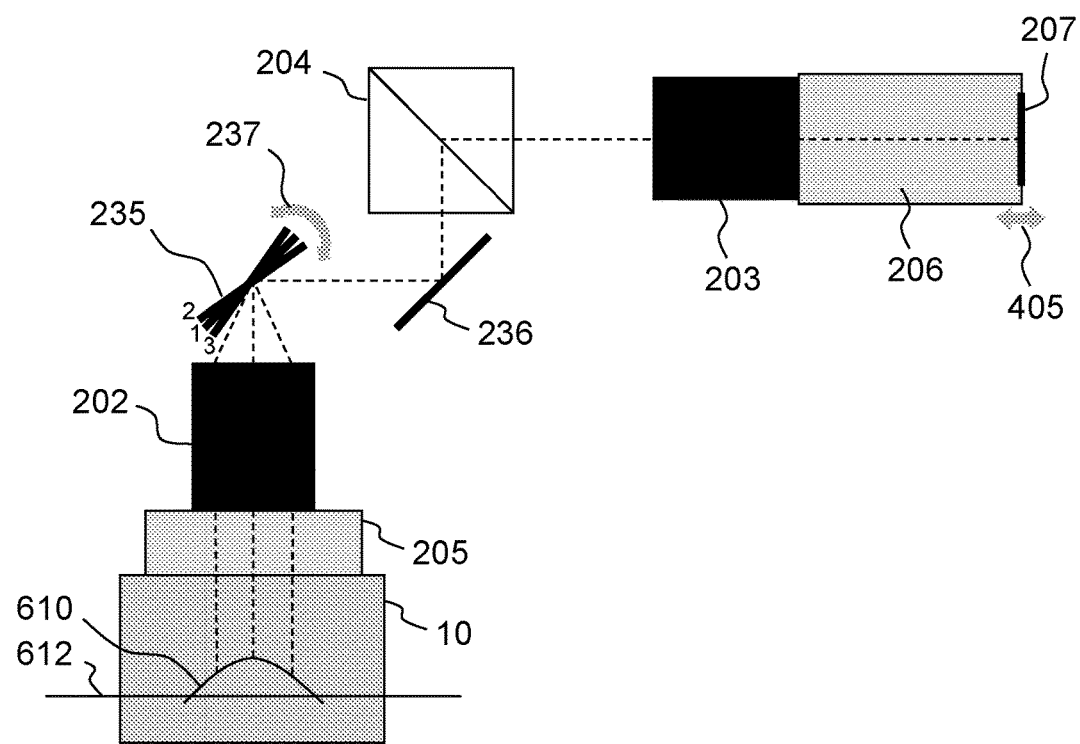
FIG. 6A is a diagram illustrating, according to one example, the coherence surface in an example of a line-scanning optical coherence tomographic microscopy device according to the present description, without compensation.
Figure 6B:
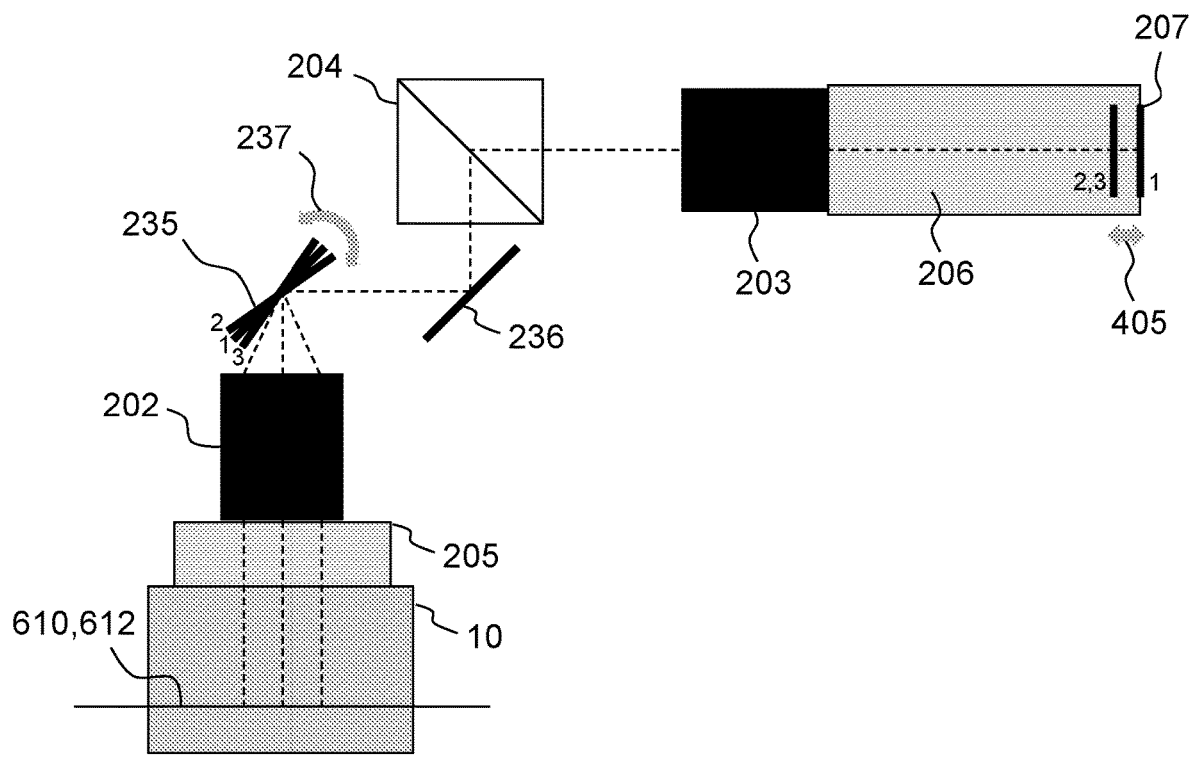
FIG. 6B is a diagram illustrating, according to one example, the coherence surface in an example of a line-scanning optical coherence tomographic microscopy device according to the present description, with compensation.

FIGS. 6A and 6B are diagrams showing an example of the coherence plane (610) and focusing plane (612) in the sample, with and without compensation. In the example of FIGS. 6A and 6B, the reflecting reference surface 207 is moved, but the desired effect would be the same if the fold reflecting surface were moved.

More precisely, in the example of FIG. 5B, the coherence surface, when the focal line is moved laterally according to the scanning illustrated in FIG. 5A, is represented by the curve 510. The zero path difference position is represented at 100 μm in depth for a position of the focal line y=0. As shown in FIG. 5B, the coherence surface is substantially parabolic when no compensating phase shift is applied. With compensation, for example by means of a variation in the axial position of the reflecting reference surface shown in FIG. 5B by the curve 512, the coherence surface, illustrated by the curve 514, is substantially flat and coincident with the focusing surface.

As is illustrated in FIGS. 6A and 6B, the reflecting reference surface 207 is dynamically driven, for example by means of a piezoelectric transducer 405, in such a way as to introduce a phase shift during the displacement of the scanning mirror 235, making it possible to maintain the position of the zero path difference of the interferometer at the level of the object (curve 610) in a plane 612 substantially perpendicular to the optical axis of the microscope objective 202. FIGS. 6A and 6B show in particular three positions (1, 2, 3) of the scanning mirror, which are associated with three positions of the reference surface for correcting the flatness of the coherence surface (zero path difference surface).

The piezoelectric transducer 405 can follow a law whose frequency is equal to that of the scanning mirror 235, and whose amplitude and shape are calibrated according to the amplitude and shape of the deviation from the zero path difference position relative to the plane perpendicular to the optical axis of the object lens, as a function of the position of the focal line. This deviation can be evaluated beforehand in order to apply a law adapted to the piezoelectric transducer. This deviation is independent of the sample and only depends on the position of the scanning mirror 235 with respect to the microscope objective 202. Once the adapted law has been determined, theoretically or empirically, it therefore no longer has any need to be adjusted.

As is shown in FIG. 5C, in order to simplify the control and the adjustment of the piezoelectric transducer 207, it is also possible to introduce a phase shift 520 varying step by step (control of the piezoelectric transducer in steps), with several operating points during the displacement of the scanning mirror 237. These operating points are chosen so as to maintain the interferometric probing in a parallelepiped 524 whose height (along the optical axis of the microscope objective 202) is considered acceptable from the point of view of sharpness of the images (therefore in relation to the depth of field of the microscope objective).

Figure 7:
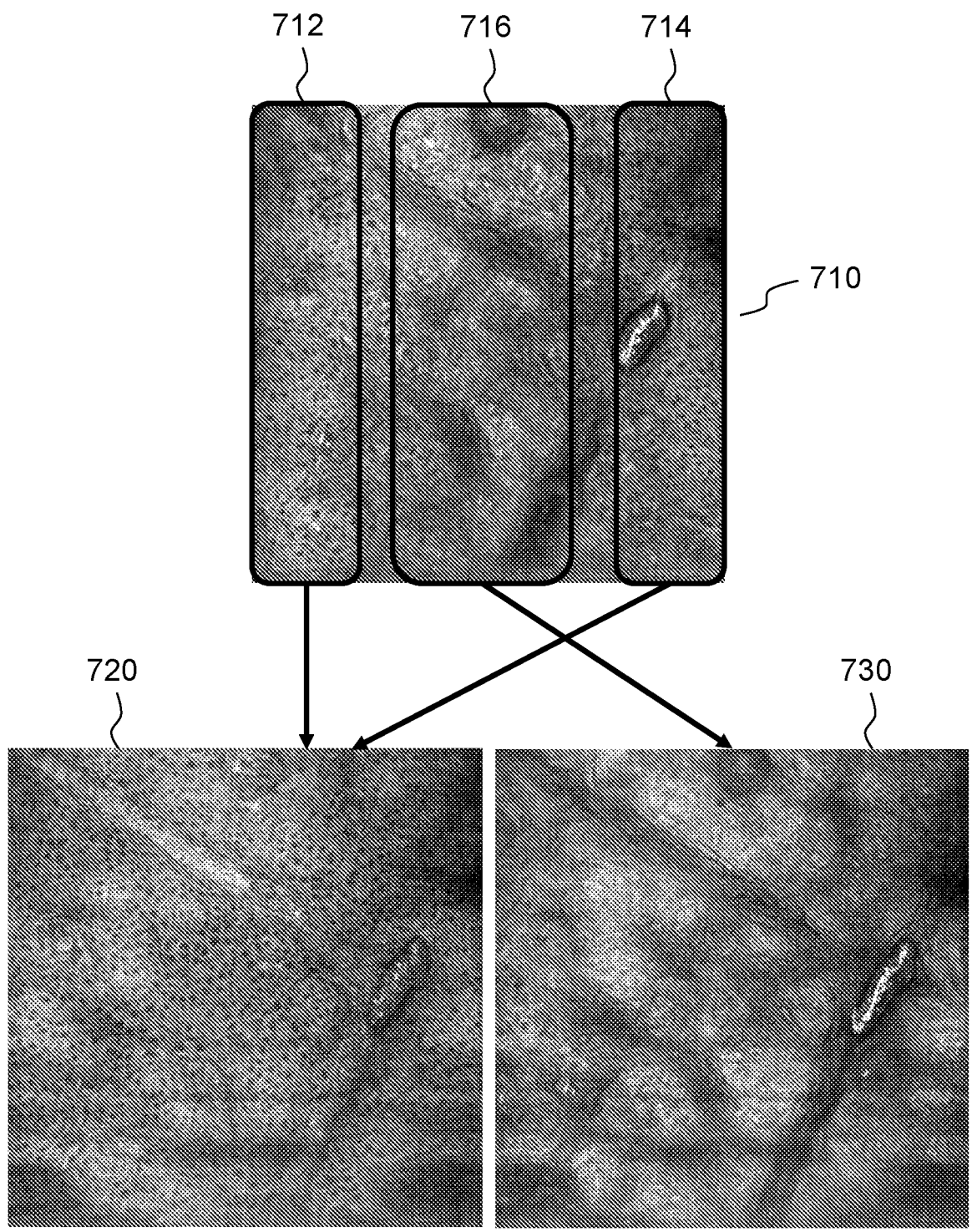
FIG. 7 shows images of a sample that are obtained by means of an exemplary method according to the present description, with and without compensation.

FIG. 7 shows an in vivo image 710 of a sample, the image being obtained by means of an exemplary method according to the present description, without compensation. The image 710 is obtained with a sample formed from the back of the hand of a 25-year-old man, over a field of 1.2×1.2 mm², with a scan of the scanning mirror 237 at a frequency of 7 Hz.

On regions 712 and 714 of the image 710, one can observe the stratum granulosum (with cells), and, on region 716, one can observe the stratum corneum (without cells), with these layers being physically at different depths. This image clearly illustrates that the coherence surface, which is the surface that one can actually observe, is not necessarily perfectly flat.

The compensation helps isolate these regions.

Thus, the images 720 and 730 correspond to images of the same field, obtained with compensation in order to make the coherence surface coincident with the focusing surface at two depths respectively. The two areas imaged are thus the stratum corneum 720 and the stratum granulosum 730.

The compensation is obtained with oscillation of the reference surface (glass slide) at 7 Hz, according to a law similar to the one shown in FIG. 5B (512). The one-dimensional tomographic images are obtained by adding a high-frequency (10 kHz) sinusoidal oscillation to the compensation signal.

Although described through a number of exemplary embodiments, the method and the device for line-scanning optical coherence tomographic microscopy according to the present description include variations, modifications and improvements which will be obvious to a person skilled in the art, it being understood that these variants, modifications and improvements form part of the scope of the invention as defined by the claims that follow.

REFERENCES

Ref 1: D. Huang et al., "*Optical coherence tomography*" Science 254(5035), 1178-1181 (1991)

Ref 2: A. F. Fercher et al. "*Optical coherence tomography—principles and applications*", Reports on Progress in Physics 66 (2003) 239-303

Ref 3: J. A. Izatt, et al., "*Optical coherence microscopy in scattering media*", OPTICS LETTERS/vol. 19, no. 8/April 15 (1994)

Ref 4: Y. Chen et al. "*High-resolution line-scanning optical coherence microscopy*" Optics Letters, vol. 32, no. 14, 1971-1973 (2007)

The invention claimed is:

1. A device for line-scanning optical coherence tomographic microscopy, comprising:

a spectrally broadband light source;

a sensor with a one-dimensional sensing surface;

an interferometric microscope comprising a reference arm, at an end of which is arranged a reflecting reference surface, an object arm configured to receive an object to be imaged, a beam splitter coupling said object arm and reference arm to said spectrally broadband light source and to said sensor, and at least a first microscope objective arranged on said object arm;

a one-dimensional confocal spatial filtering device configured to interact with said spectrally broadband light source in order to illuminate said object along a focal line located in an object space of said first microscope objective, and configured to select light backscattered by said object and coming from said focal line, so as to form a one-dimensional image of said focal line on a detection surface;

a device for unidirectional scanning of said focal line comprising a reflecting surface and means for rotating the reflecting surface along an axis of rotation substantially perpendicular to an optical axis (z) of the first microscope objective, said reflecting surface being arranged on said object arm, upstream of said first microscope objective, such that the object arm does not include any optical element for the optical conjugation of the reflecting surface and an entrance pupil of the first microscope objective, the device for unidirectional scanning being configured to scan the focal line in a lateral direction (y) substantially perpendicular to the optical axis (z) of said first microscope objective;

a fold reflecting surface arranged in the reference arm, and means for moving said fold reflecting surface in an axial direction ($z_r$) and/or a lateral direction ($y_r$); and a processing unit configured to produce a two-dimensional tomographic en-face image of said object to be observed, arranged in a plane (x, y) substantially perpendicular to said optical axis of the first microscope objective, from a plurality of one-dimensional interferometric images of the object that are produced by the interferometric microscope for different positions of said focal line during said unidirectional scanning and for different positions of said fold reflecting surface, and that are acquired by said sensor.

2. The device as claimed in claim 1, wherein said processing unit is configured to:

produce a plurality of one-dimensional tomographic images of said object, each image of said plurality of one-dimensional tomographic images being produced from a plurality of one-dimensional interferometric images acquired by said sensor for different positions of said focal line during said unidirectional scanning; and produce said two-dimensional tomographic en-face image of said object from said plurality of one-dimensional tomographic images.

3. The device as claimed in claim 1, further comprising:
means for unidirectional displacement of said reflecting reference surface in an axial direction (zr); and wherein said processing unit is configured to:
produce a plurality of one-dimensional tomographic images of said object, each image of said plurality of one-dimensional tomographic images being produced from a plurality of one-dimensional interferometric images acquired by said sensor for different positions of the reflecting reference surface; and
produce said two-dimensional tomographic en-face image of said object from said plurality of one-dimensional tomographic images.

4. The device as claimed in claim 3, wherein:
for each image of said plurality of one-dimensional tomographic images, said means for moving said reflecting reference surface are configured to further introduce an additional axial displacement of said reflecting reference surface, making it possible to compensate for a phase shift introduced by the device for scanning the focal line.

5. The device as claimed in claim 1,
wherein said processing unit is configured to:
produce a plurality of one-dimensional tomographic images of said object, each image of said plurality of one-dimensional tomographic images being produced from a plurality of one-dimensional interferometric images acquired by said sensor for different positions of said fold reflecting surface; and
produce said two-dimensional tomographic en-face image of said object from said plurality of one-dimensional tomographic images.

6. The device as claimed in claim 5, wherein:
for each image of said plurality of one-dimensional tomographic images, said means for moving said fold reflecting surface are configured to further introduce an additional displacement of said fold reflecting surface, making it possible to compensate for a phase shift introduced by the device for scanning the focal line.

7. The device as claimed in claim 1, further comprising a device for chromatic dispersion compensation arranged on one and/or the other of said object arm and reference arm.

8. The device as claimed in claim 1, wherein said interferometric microscope is a Linnik microscope, further comprising a second microscope objective, arranged on said reference arm, said reference arm and object arm being separate.

9. The device as claimed in claim 1, further comprising:
means for axial displacement of said focal line in a direction parallel to said optical axis of said first microscope objective for a displacement of said focal line in depth in the object; and wherein:
the processing unit is configured to further produce a three-dimensional image of said object to be observed, from a plurality of en-face images that are produced for different depths of the focal line.

10. The device as claimed in claim 9, wherein:
said means for axially moving the focal line comprise displacement means, integral with an assembly comprising said first microscope objective and said beam splitter, for moving in a direction parallel to said optical axis of said first microscope objective.

11. A method for line-scanning optical coherence tomographic microscopy, comprising:
forming an illumination beam using a spectrally broadband light source;
separating the illumination beam, by means of a beam splitter, into a first light fraction and a second light fraction, said first light fraction being sent into a reference arm at an end of which a reflecting reference surface is arranged, said second light fraction being sent into an object arm receiving an object to be imaged;
focusing said second light fraction, by means of a first microscope objective arranged on said object arm and interacting with a confocal spatial filtering device, in order to illuminate said object to be imaged along a focal line located in an object space of said first microscope objective;
selecting, by means of said confocal spatial filtering device, light backscattered by the object and coming from said focal line in order to form a one-dimensional image of said focal line on a one-dimensional sensing surface of a sensor;
combining, by means of said beam splitter, the thus selected light backscattered by the object and light resulting from a reflection, by the reflecting reference surface of the reference arm, of said first light fraction, in order to generate a one-dimensional interferometric image;
scanning said focal line in one direction, in a lateral direction (y) substantially perpendicular to an optical axis (z) of said first microscope objective, by means of a scanning device comprising a reflecting surface and means for rotating the reflecting surface along an axis of rotation substantially perpendicular to said optical axis of the first microscope objective, said reflecting surface being arranged on said object arm upstream of said first microscope objective, such that the object arm does not include any optical element for the optical conjugation of the reflecting surface and an entrance pupil of the first microscope objective;
moving a fold reflecting surface arranged in the reference arm in an axial direction ($z_r$) and/or a lateral direction ($y_r$); and
producing, by means of a processing unit, a two-dimensional tomographic en-face image of said object to be observed, arranged in a plane (x, y) substantially perpendicular to said optical axis of the first microscope objective, from a plurality of one-dimensional interferometric images acquired by said sensor for different positions of said focal line during unidirectional scanning and for different positions of said fold reflecting surface.

12. The method as claimed in claim 11, wherein producing said two-dimensional tomographic en-face image of said object comprises:
producing a plurality of one-dimensional tomographic images of said object, each image of said plurality of one-dimensional tomographic images being produced from a plurality of one-dimensional interferometric images acquired by said sensor for different positions of said focal line during said unidirectional scanning; and producing said two-dimensional tomographic en-face image of said object from said plurality of one-dimensional tomographic images.

13. The method as claimed in claim 11, wherein producing said two-dimensional tomographic en-face image of said object comprises:
producing a plurality of one-dimensional tomographic images of said object, each image of said plurality of one-dimensional tomographic images being produced from a plurality of one-dimensional interferometric images acquired by said sensor for different positions of the reflecting reference surface or for different positions of the fold reflecting surface arranged in the reference arm; and
producing said two-dimensional tomographic en-face image of said object from said plurality of one-dimensional tomographic images.

14. The method as claimed in claim 13, further comprising:
for each image of said plurality of one-dimensional tomographic images, introducing an additional axial displacement of said reflecting reference surface or of said fold reflecting surface, making it possible to compensate for a phase shift introduced by the scanning device for scanning the focal line.

15. The method as claimed in claim 11, further comprising:
axially moving said focal line in depth in the object, in a direction parallel to said optical axis of said first microscope objective; and
producing a three-dimensional image of said object to be observed, from a plurality of en-face images that are produced for different depths of the focal line.

* * * * *